United States Patent
Bansal et al.

(10) Patent No.: US 10,572,350 B1
(45) Date of Patent: Feb. 25, 2020

(54) SYSTEM AND METHOD FOR IMPROVED APPLICATION CONSISTENCY IN A DISTRIBUTED ENVIRONMENT

(71) Applicant: EMC IP Holding Company LLC, Hopkinton, MA (US)

(72) Inventors: Aaditya Rakesh Bansal, Bangalore (IN); Sunil Yadav, Bangalore (IN); Shelesh Chopra, Bangalore (IN); Soumen Acharya, Bangalore (IN); Manish Sharma, Bangalore (IN); Sudha Vamanraj Hebsur, Bangalore (IN); Hareej G. Hebbur, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 23 days.

(21) Appl. No.: 16/161,860

(22) Filed: Oct. 16, 2018

(51) Int. Cl.
*G06F 11/14* (2006.01)
*G06F 9/455* (2018.01)

(52) U.S. Cl.
CPC ...... *G06F 11/1464* (2013.01); *G06F 9/45558* (2013.01); *G06F 11/1451* (2013.01); *G06F 11/1456* (2013.01); *G06F 2201/815* (2013.01); *G06F 2201/84* (2013.01)

(58) Field of Classification Search
None
See application file for complete search history.

(56) References Cited

U.S. PATENT DOCUMENTS

| 8,954,789 B2* | 2/2015 | Rangachari | G06F 3/065 711/159 |
| 9,971,525 B2* | 5/2018 | Litke | G06F 3/0619 |
| 2019/0179918 A1* | 6/2019 | Singh | G06F 11/1448 |

* cited by examiner

Primary Examiner — Brian R Peugh
(74) Attorney, Agent, or Firm — Chamberlain, Hrdlicka, White, Williams, & Aughtry (57) ABSTRACT

A production host for hosting virtual machines includes a persistent storage and a production agent. The persistent storage stores virtual machine data associated with a virtual machine of the virtual machines and a virtual machine shadow copy associated with the virtual machine data. The production agent obtains a backup generation request for the virtual machine; in response to the backup generation request, generates the virtual machine shadow copy; makes a determination that the virtual machine shadow copy comprises an auto-recovery disk that comprises some data; in response to the determination, merges the virtual machine shadow copy using a parent block set storage template to obtain a backup of the virtual machine; and store the backup in backup storage. The parent block set storage template is not associated with the virtual machine shadow copy.

20 Claims, 9 Drawing Sheets

SYSTEM AND METHOD FOR IMPROVED APPLICATION CONSISTENCY IN A DISTRIBUTED ENVIRONMENT

BACKGROUND

Computing devices may include any number of internal components such as processors, memory, and persistent storage. Each of the internal components of a computing device may be used to generate data. The process of generating, storing, and backing up data may utilize computing resources of the computing device such as processing and storage. The utilization of the computing resources to generate backups may impact the overall performance of the computing devices. As more computing resources are used for backup generation, the primary functions of computing devices may be negatively impacted from the point of view of a user.

SUMMARY

In one aspect, a production host for hosting virtual machines in accordance with one or more embodiments of the invention includes a persistent storage and a production agent. The persistent storage stores virtual machine data associated with a virtual machine of the virtual machines and a virtual machine shadow copy associated with the virtual machine data. The production agent obtains a backup generation request for the virtual machine; in response to the backup generation request, generates the virtual machine shadow copy; makes a determination that the virtual machine shadow copy comprises an auto-recovery disk that comprises some data; in response to the determination, merges the virtual machine shadow copy using a parent block set storage template to obtain a backup of the virtual machine; and store the backup in backup storage. The parent block set storage template is not associated with the virtual machine shadow copy.

In one aspect, a method for hosting virtual machines in accordance with one or more embodiments of the invention includes obtaining a backup generation request for a virtual machine of the virtual machines; in response to the backup generation request, generating a virtual machine shadow copy using virtual machine data associated with a virtual machine of the virtual machines; making a determination that the virtual machine shadow copy comprises an auto-recovery disk that comprises some data; in response to the determination, merging the virtual machine shadow copy using a local block set storage template to obtain a backup of the virtual machine, the local block set storage template is associated with the virtual machine shadow copy; and storing the backup in backup storage. The local block set storage template is disassociated from the virtual machine data.

In one aspect, a non-transitory computer readable medium in accordance with one or more embodiments of the invention includes computer readable program code, which when executed by a computer processor enables the computer processor to perform a method for hosting virtual machines. The method includes obtaining a backup generation request for a virtual machine of the virtual machines; in response to the backup generation request, generating a virtual machine shadow copy using virtual machine data associated with a virtual machine of the virtual machines; making a determination that the virtual machine shadow copy comprises an auto-recovery disk that comprises some data; in response to the determination, merging the virtual machine shadow copy using a local block set storage template to obtain a backup of the virtual machine, the local block set storage template is associated with the virtual machine shadow copy; and storing the backup in backup storage. The local block set storage template is disassociated from the virtual machine data.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for generating backups of virtual machines and restoring the virtual machines to predetermined states. Embodiments of the invention may enable backups of the virtual machines to be generated while continuous changes are being made to the virtual machines. For example, an application hosted by the virtual machine may continue to receive input while the backups of the virtual machines are being generated. By doing so, embodiments of the invention may improve the operation of virtual machines in a distributed environment by enabling them to continuously operate while backups are being generated. In other words, embodiments of the invention may reduce or eliminate phantom slowdowns of virtual machines caused by contemporary methods of generating backups of the virtual machines.

Figure 1:
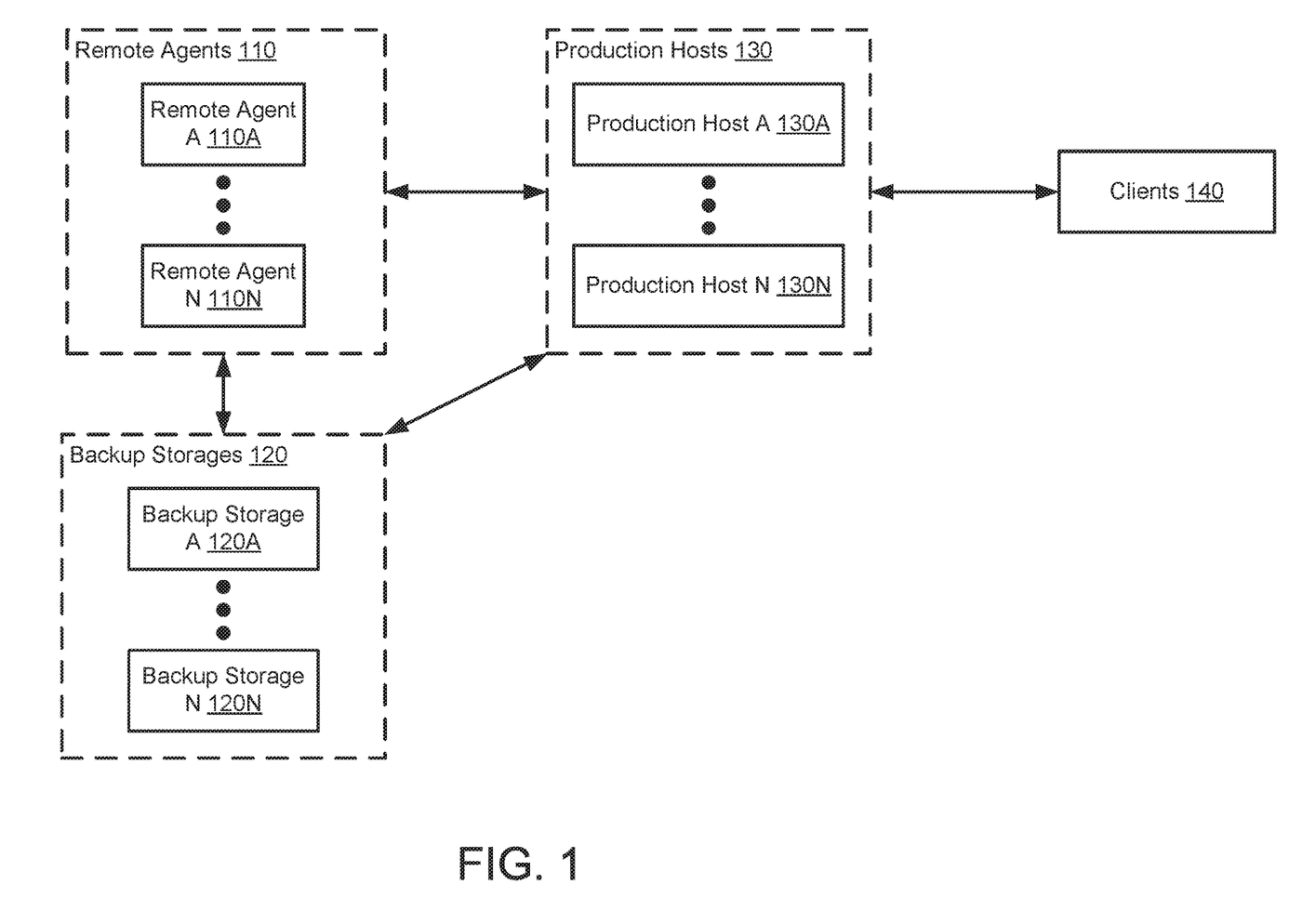
FIG. 1 shows a diagram of a system in accordance with one or more embodiments of the invention.

FIG. 1 shows an example system in accordance with one or more embodiments of the invention. The system may include production hosts (130) that host applications. The applications may provide services to the clients (140). For example, the applications may provide database services utilized by the clients (140). The applications may provide other types of services to the clients without departing from the invention.

When the clients (140) utilize the services of the applications, the clients (140) may cause data that is relevant to the clients (140) to be stored in the production hosts (130). For example, a client may add entries to a database hosted by the production hosts. Doing so may cause data that the client may wish to have access to in the future to be stored in the production hosts (130).

The system may further include remote agents (110) that provide backup services to the production hosts (130). The backup services may include: (i) generation and storage of backups of portions of the production hosts (130) in backup storages (120) and (ii) restoration of the production hosts (130) utilizing backups previous stored in the backup storages (120). By doing so, clients (140) may have an improved likelihood of being able to obtain data that is relevant to the clients from the production hosts (130) when compared to scenarios in which backups of portions of the production hosts (130) are not generated and stored.

In one or more embodiments of the invention, the remote agents (110) provide backup services to the production hosts (130) without interrupting the services provided by the applications hosted by the production hosts (130). For example, a database hosted by the production hosts (130) may continue to receive data from the clients (140) for storage in the database while a backup of the database, or an entity hosting the database, is generated. By doing so, embodiments of the invention may improve backup technology and distributed systems by improving an uptime of the services provided by applications that are backed up when compared to contemporary distributed systems and backup technology.

The components illustrated in FIG. 1 may be connected via any number of operable connections supported by any combination of wired and/or wireless networks. Each component of the system of FIG. 1 may be operably connected via any combination of wired and/or wireless connections. Each component of the system of FIG. 1 is discussed below.

As noted above, the production hosts (130) may host applications that provide services to the clients (140). The production hosts (130) may host any number of applications, any type of application, and the hosted applications may provide any types of services to the clients (140) and/or any other entities.

In one or more embodiments of the invention, the production hosts (130) host virtual machines. In turn, the virtual machines hosted by the production hosts (130) may host applications. For example, a production host (e.g., 130A) may host a virtual machine that hosts a database application. A virtual machine may host any number of applications and any type of application without departing from the invention. For example, a first production host (e.g., 130A) may host an electronic communication server application and a second production host (e.g., 130N) may host a database application.

In one or more embodiments of the invention, the production hosts (130) are implemented as computing devices. The computing devices may be, for example, mobile phones, tablet computers, laptop computers, desktop computers, servers, distributed computing systems, or cloud resources. Each computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the production hosts (130) described throughout this application and/or all, or a portion, of the method illustrated in FIG. 4. For additional details regarding computing devices, refer to FIG. 6.

In one or more embodiments of the invention, the production hosts (130) are implemented as logical devices. Each of the logical devices may utilize the computing resources of any number of computing devices and thereby provide the functionality of the production host (130) described throughout this application and/or all, or a portion, of the method illustrated in FIG. 4. For additional details regarding the production hosts (130), refer to FIG. 2A.

In one or more embodiments of the invention, the clients (140) utilize services hosted by the production hosts (130). By utilizing the services provided by the production hosts (130), data that is relevant to the clients (140) may be stored in the production hosts (130). For example, consider a scenario in which a production host is hosting a database utilized by a client. The client may store data in entries of the database. At a later point in time, the client may request access to the data stored in entries of the database. In another example, a production host may host an electronic communications server application. A client may draft an electronic communication and send the draft electronic communication using the electronic communications server application. When sending the electronic communication, the electronic communication server application may store a copy of the electronic communication locally in the production host. At a later time, the client or another entity may request access to the stored copy of the electronic medication. Data stored in the production hosts may become relevant to the clients (140) via other scenarios without departing from the invention.

In one or more embodiments of the invention, the clients (140) are implemented as computing devices. A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functions of the clients (140) described throughout this application and/or all, or a portion, of the method illustrated in FIG. 4. For additional details regarding computing devices, refer to FIG. 6.

In one or more embodiments of the invention, the clients (140) are implemented as logical devices. Each logical device may utilize the computing resources of any number of computing devices and thereby provide the functionality of the clients (140) described throughout this application.

In one or more embodiments of the invention, the remote agents (110) provide backup services to the production hosts (130). The backup services may include: (i) generation and/or storage of backups in backup storage (120) and/or (ii) restoring the production hosts (130) to previous states using backups stored in the backup storage (120).

In one or more embodiments of the invention, the remote agents (110) generate backups of portions of the production hosts (130). For example, the remote agents (110) may generate backups of virtual machines hosted by the production hosts (130). Generation of a backup of a virtual machine may enable the virtual machine to be restored to a previous state of the virtual machine at a predetermined point in time. The predetermined point in time may be the point in time at which the backup was generated. The remote agents (110) may generate backups of virtual machines while applications hosted by the virtual machines provide services to the clients (140).

In one or more embodiments of the invention, the remote agents (110) store generated backups in the backup storages (120). The remote agents (110) may do so by causing the backups to be transmitted to the backup storages (120). The remote agents (110) may store the generated backups in the backup storages (120) while applications hosted by the virtual machines provide services to clients (140).

In one or more embodiments of the invention, the remote agents (110) restore production hosts (130) using backups stored in the backup storages (120). The remote agents (110) may do so by causing one or more backups to be transmitted to the production hosts (130). After transmission, the one or more backups to be used to instantiate a virtual machine for which the restoration is being performed.

In one or more embodiments of the invention, the remote agents (110) are implemented as computing devices. A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the remote agents (110) described throughout this application and/or all, or a portion, of the method illustrated in FIG. 4. For additional details regarding computing devices, refer to FIG. 6.

In one or more embodiments of the invention, the remote agents (110) are implemented as logical devices. Each logical device may utilize the computing resources of any number of computing devices and thereby provide the functionality of each of the remote agents (110) described throughout this application and/or all, or a portion, of the method illustrated in FIG. 4.

In one or more embodiments of the invention, the backup storages (120) provide data storage services. For example, the backup storages (120) may store copies of backups generated by the production hosts (130). Similarly, the backup storages (120) may provide copies of backups of the production hosts (130) that were previously stored in the backup storages (120).

In one or more embodiments of the invention, the backup storages (120) store data in a deduplicated format. For example, the backup storages (120) may check to see whether data, or portions of the data, that is to be stored in the backup storages (120) is already stored in the backup storages (120). The backup storages (120) may only store unique data in response to data storage requests. By doing so, quantity of data stored in the backup storages (120) may be larger than the quantity of data that may be stored without deduplication.

In one or more embodiments of the invention, the backup storages (120) are implemented as computing devices. A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functions of the backup storages (120) described throughout this application and/or all, or a portion, of the method illustrated in FIG. 4. For additional details regarding computing devices, refer to FIG. 6.

While the system of FIG. 1 has been illustrated as including a limited number of components for the sake of brevity, the system may include additional components (not shown), fewer components, and/or different components (not shown) without departing from the invention.

Figure 2A:
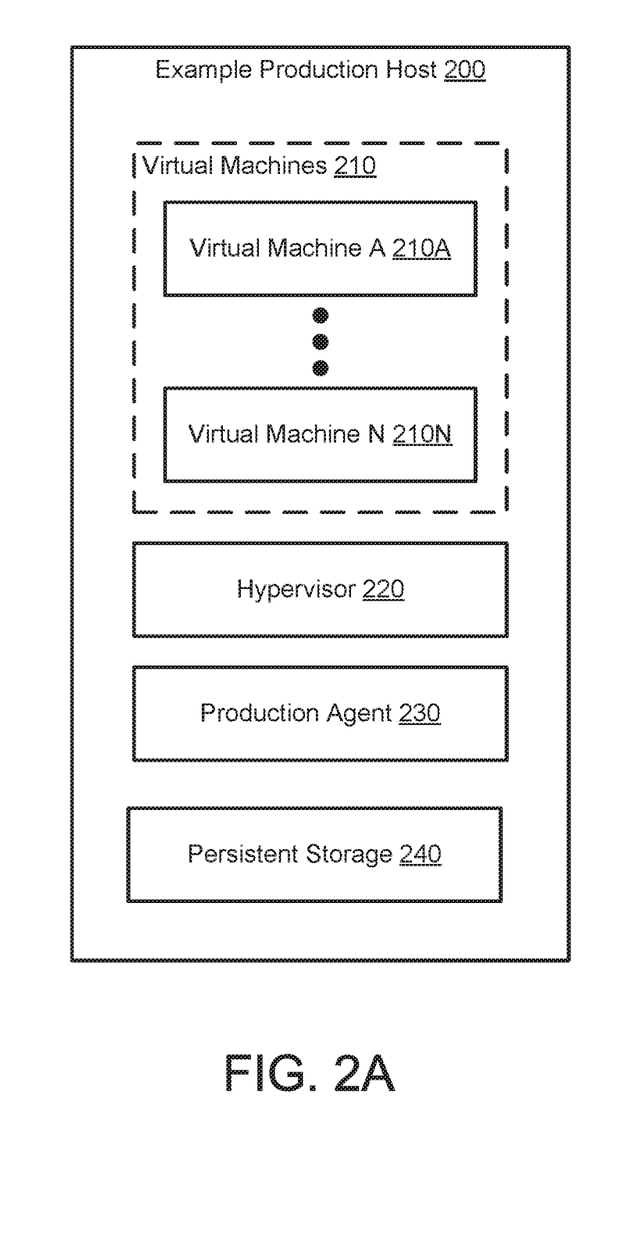
FIG. 2A shows a diagram of an example production host in accordance with one or more embodiments of the invention.

As discussed above, production hosts (130) may provide services to the clients (140). FIG. 2A shows a diagram of an example production host (200) in accordance with one or more embodiments of the invention. The example production host (200) may be similar to a production host (130) discussed above.

As discussed above, production hosts may provide services to clients and, consequently, stored data that is relevant to the clients locally in the production hosts. To improve the ability of the production hosts to provide the stored data that is relevant to the clients as well as continue to provide services that are desired by the clients, the example production host (200) include functionality to generate and/or stored data in backup storage. The example production host (200) may do so under the direction of a remote agent that orchestrates such data storage processes. To provide the above-noted functionality, the example production host (200) include virtual machines (210) that host applications that provide services to clients, a hypervisor (220) that manages the virtual machines (210), production agent (230) that manages performance of backups/restorations of the virtual machines (210), and a persistent storage (240). Each component of the example production host (200) is discussed below.

In one or more embodiments of the invention, the virtual machines (210) are logical entities executing using computing resources of the example production host (200) and/or other computing devices. Each of the virtual machines (e.g., 210A, 210N) may perform similar or different processes. For example, each of the virtual machines may host any number of applications that provide any type of service.

Thus, each of the virtual machines (210) and be similar to or different from any of the other virtual machines.

For example, a first virtual machine (e.g., 210A) may host a database that provides database services to the clients. The second virtual machine (e.g., 210N) may host a messaging service application that provides instant messaging services to the clients. The virtual machines (210) may host different applications such as, for example, databases, electronic communication distribution applications, instant messaging applications, file storage applications, and/or other applications. The virtual machines (210) may host other types of applications without departing from the invention.

Figure 4:
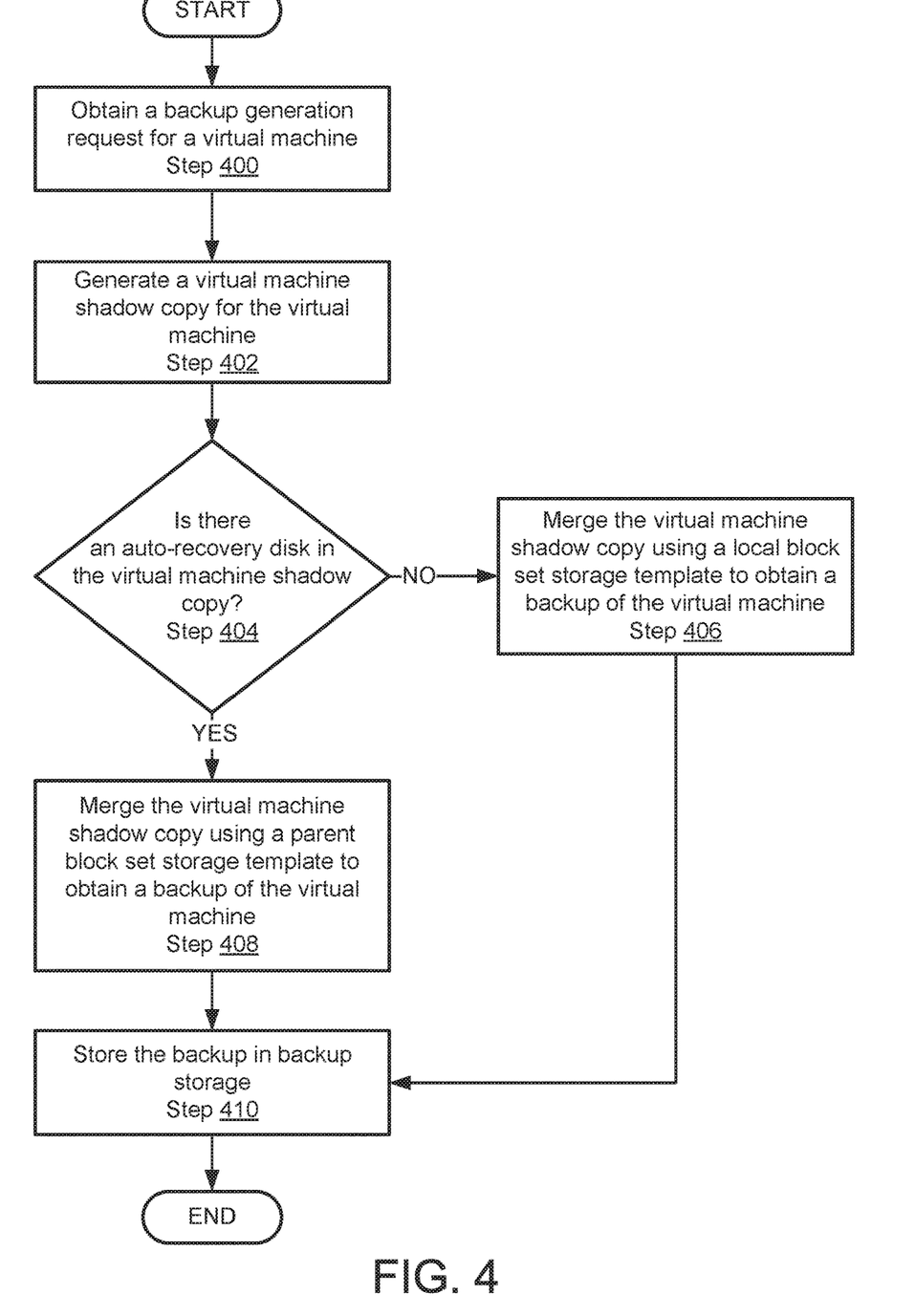
FIG. 4 shows a flowchart of a method of performing a backup of a virtual machine in accordance with one or more embodiments of the invention.

In one or more of embodiments of the invention, the virtual machines (210) are implemented as computer instructions, e.g., computer code, stored on a persistent storage that when executed by a processor of the example production host (200) cause the example production host (200) to provide the functionality of the virtual machines (210) described throughout the application and/or all or a portion of the method illustrated in FIG. 4.

In one or more embodiments of the invention, the hypervisor (220) orchestrates the operation of the virtual machines (210). The hypervisor (220) may orchestrate the operation of the virtual machines (210) by allocating computing resources to each of the virtual machines (210). The hypervisor (220) may instantiate, terminate, and/or modify the operation of the virtual machines (210) in any manner without departing from the invention.

In one or more embodiments of the invention, the hypervisor (220) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the hypervisor (220) described throughout this application and/or all or a portion of the method illustrated in FIG. 4.

In one or more of embodiments of the invention, the hypervisor (220) is implemented as computer instructions, e.g., computer code, stored on a persistent storage that when executed by a processor of the example production host (200) causes the example production host (200) to provide the functionality of the hypervisor (220) described throughout the application and/or all, or a portion, of the method illustrated in FIG. 4.

In one or more embodiments of the invention, the production agent (230) manages performance of backups and/or restorations of the virtual machines (210). The operation of the production agent (230) may be governed by remote agents that orchestrate generation of backups and/or restoration of entities within a distributed system.

In one or more embodiments of the invention, the production agent (230) receives instructions from remote agents, or other entities, and acts in response to the instructions. For example, the production agent (230) may receive instructions to generate a backup of a virtual machine from a remote agent. In response to these instructions, production agent (230) may generate the backup.

To generate backups of the virtual machines (210), the production agent (230) may include functionality to control the operation of the virtual machines (210). For example, production agent (230) may include functionality to quiesce virtual machines. Quiescing a virtual machine may place the virtual machine in a consistent state. Quiescing virtual machine may flush any buffers associated with the virtual machine and suspend execution of the virtual machine for predetermined period of time. By doing so, a virtual machine may be placed in a state where its application data in the persistent storage (240) accurately reflects the state of the virtual machine.

The production agent (230) may also include functionality to redirect, or otherwise cause, input destined for a virtual machine to be stored in one or more buffers in memory or the persistent storage (240). The production agent (230) may use this functionality while the virtual machine is a quiesced state to allow clients to continue to send input to the virtual machine it's while the virtual machine is quiesced. By doing so, the virtual machine, and applications hosted by the virtual machine, may appear to continuously operate even though it was quiesced for a period of time.

The production agent (230) may further include functionality to generate backups based on different storage layouts. A storage layout may specify how data is stored within a physical medium. For example, a storage layout may specify where data is stored and/or where metadata regarding the data is stored within the physical medium. As will be discussed in greater detail below, the production agent (230) may utilize this functionality when generating backups and storing backups and backup storage to ensure that the stored backups may be used for restoration purposes.

In one or more embodiments of the invention, the production agent (230) is adapted to generate backups of virtual machines while applications hosted by the virtual machines are providing services to clients. For example, production agent (230) may quiesce virtual machine, generate a backup of the virtual machine, and return the virtual machine to execution using data stored in a buffer while the virtual machine was quiesced. By doing so, backups of virtual machines may be generated without interrupting services provided by the virtual machines. For additional details regarding generation of backups, refer to FIG. 2B.

In one or more embodiments of the invention, the production agent (230) is a hardened entity, i.e., not modifiable by an entity that is remote to the example production host (200) on which the production agent (230) is executing. The production agent (230) may have a set, finite number of predefined functions that may be invoked by a remote entity. In one or more embodiments of the invention, the production agent (230) is not configurable by modifying settings or associated configuration files by a remote entity.

In one or more embodiments of the invention, the production agent (230) is implemented as computer instructions, e.g., computer code, stored on a persistent storage that when executed by a processor of the example production host (200) cause the example production host (200) to provide the functionality of the production agent (230) described throughout the application and/or all, or a portion, of the method illustrated in FIG. 4.

In one or more embodiments of the invention, the production agent (230) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the production agent (230) described throughout this application and/or all, or a portion, of the method illustrated in FIG. 4.

In one or more embodiments of the invention, the persistent storage (240) stores data structures used by components of the example production host (200). The persistent storage (240) may be, for example, hard disk drives, solid state drives, tape drives, or any combination thereof. The persistent storage (240) may be other types of digital storage without departing from the invention. The persistent storage (240) may be a virtualized storage without departing from the invention. For additional details regarding the persistent storage (240), See FIG. 2B.

Figure 2B:
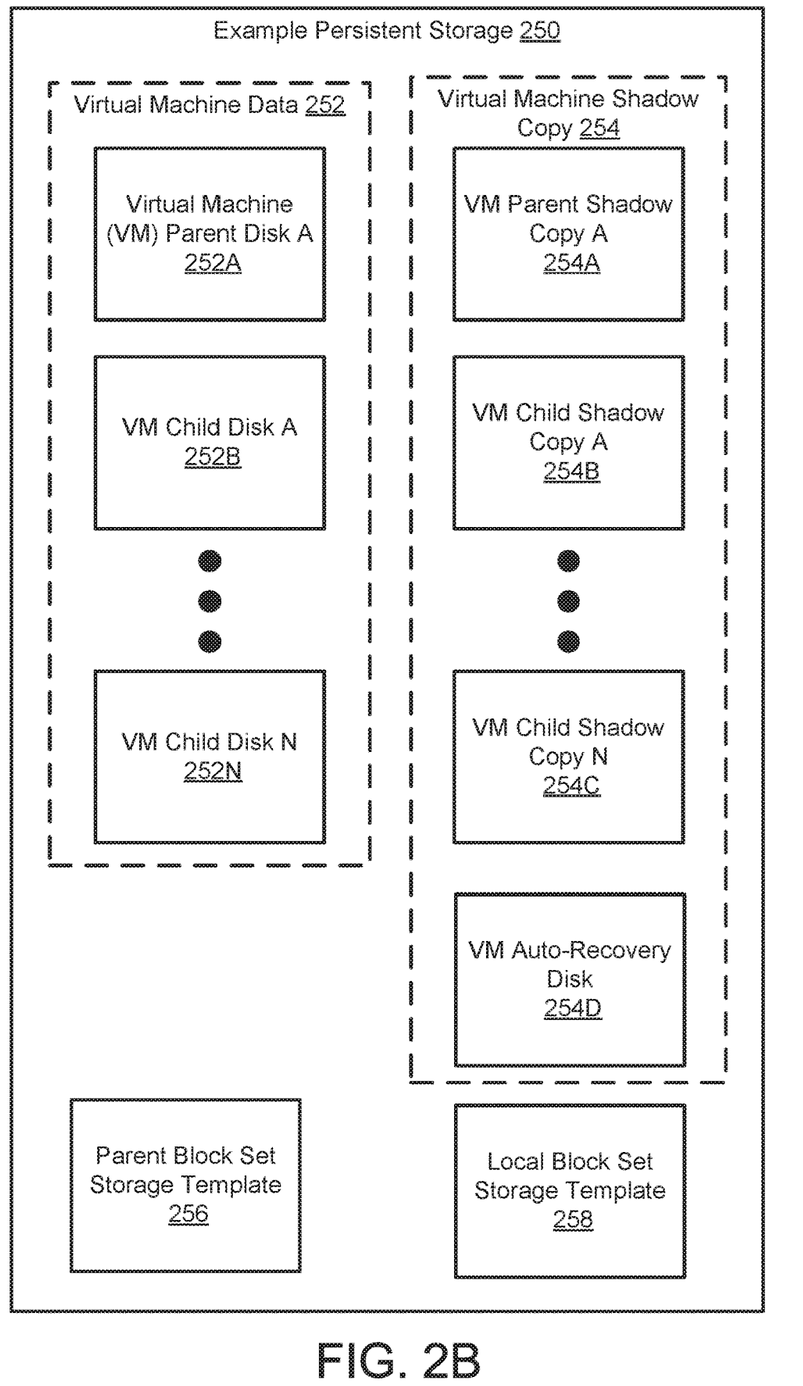
FIG. 2B shows a diagram of an example persistent storage of the production host of FIG. 2A in accordance with one or more embodiments of the invention.

FIG. 2B shows a diagram of an example persistent storage (250) in accordance with one or more embodiments of the invention. The example persistent storage (250) may be similar to the persistent storage (240, FIG. 2A) discussed above. The example persistent storage (250) may include virtual machine data (252), a virtual machine shadow copy (254), a parent block set storage template (256), and a local block set storage template (258). The example persistent storage (250) may include additional, fewer, and/or different data structures without departing from the invention. Each of the aforementioned data structures of the example persistent storage (250) is discussed below.

The virtual machine data (252) may be data associated with a virtual machine. For example, the virtual machine data (252) may include application data, operating system data, and any other data associated with a virtual machine. The virtual machine data (252) may include any type and quantity of data.

To enable the virtual machine data (252) to be backed up and/or restored to a prior state, the virtual machine data (252) may be divided into any number of disks (e.g., 252A, 252B, 252N). Each of these disks may reflect the data of a virtual machine at a point in time or changes to the data of a virtual machine over a period of time.

In one or more embodiments of the invention, the virtual machine data (252) includes a virtual machine parent disk (252A) that reflects the data of a virtual machine at a point in time. For example, the virtual machine parent disk (252A) may be an image of a virtual machine at a particular point in time. The virtual machine parent disk (252A) may be a read-only data structure.

In one or more embodiments of the invention, the virtual machine data (252) includes any number of child disks (e.g., 252B, 252N). Each of the child disks may reflect changes to the data of a virtual machine over different periods of time. For example, a virtual machine child disk may reflect the changes to the data of the virtual machine from 1 PM to 3 PM. A second virtual machine child disk may reflect the changes to the data of the virtual machine from 3 PM to 5 PM. If the data of the virtual machine is known at 1 PM, the data of the virtual machine at 3 PM and 5 PM may be determined using these child disks. To determine the data of the virtual machine at 3 PM, the virtual machine child disk may be merged with the parent disk. To determine the data of the virtual machine at 5 PM, both of the child disks may be merged with the parent disk. Merging each of the respective disks results in a data structure that represents the data of the virtual machine at a predetermined point in time.

In one or more embodiments of the invention, a virtual machine parent disk is a read only data structure. In other words, a virtual machine parent disk may generally only be readable. However, the contents of the virtual machine parent disk may be modified by merging child disks with the parent disk. By doing so, the contents of the virtual machine parent disk may be modified to reflect a state of the virtual machine associated with the child disk. For example, applying the changes specified by the child disk may change the contents of the virtual machine parent disk to reflect the state of the virtual machine after application of the changes specified by the child disk. As will be discussed in greater detail below, child disks may be merged with parent disks when backups of the virtual machine data (252) are generated.

In one or more embodiments of the invention, the virtual machine shadow copy (254) is a data structure generated and used for backup generation purposes. For example, the virtual machine shadow copy (254) may be generated in response to a backup generation request for a virtual machine. The virtual machine shadow copy (254) may include a virtual machine parent shadow copy (254A), one or more virtual machine child shadow copies (e.g., 254B, 254C), and may also include a virtual machine auto-recovery disk (254D). Each component of the virtual machine shadow copy (254) is discussed below.

The virtual machine parent shadow copy (254A) may be a copy of the virtual machine parent disk (252A). The virtual machine parent shadow copy (254A) may be an identical copy of the virtual machine parent disk (252A).

Each of the virtual machine child shadow copies, except for the mostly recently created virtual machine child shadow copy (e.g., 254C), may be copies of corresponding virtual machine child disks (e.g., 252B, 252N). For example, the virtual machine child shadow copy A (254B) may be an identical copy of the virtual machine child disk A (252B).

The last virtual machine child shadow copy may not be an identical copy of the last virtual machine child disk (252N). The most recently generated virtual machine child shadow copy may include less data then the most recently created virtual machine child disk.

For example, the most recently generated virtual machine child shadow copy may not include the changes to the virtual machine after a backup generation process is initiated. Such changes may be stored in a virtual machine auto-recovery disk (254D). Thus, the most recently generated virtual machine child shadow copy (e.g., 254C) and the virtual machine auto-recovery disk (254D) may include the same information as the most recently created virtual machine child disk (252N). However, the data layout for used by a virtual machine shadow copy, virtual machine auto-recovery disk, and an associated virtual machine child disk may be different. Accordingly, while the contents of these data structures may be related, the format of each may be different.

In addition to the data (e.g., 252, 254) associated with a virtual machine, the example persistent storage (250) may also include a parent block set storage template (256) and a local block set storage template (258). The parent block set storage template (256) may specify the data layout of the last backup that was stored in backup storage and associated with the virtual machine data (252). For example, the parent block set storage template (256) may specify offsets used to store the last backup that was stored in backup storage. The local block set storage template (258) may specify the data layout of the virtual machine parent shadow copy (254A). Thus, the parent block set storage template (256) may reflect an arrangement of data already present in backup storage while the local block set storage template (258) reflects an arrangement of data currently present in the example persistent storage (250). As will be discussed below in greater detail, because these arrangements may be different, embodiments of the invention may provide a method of utilizing these arrangements to minimize computing resources cost of storing data backup storage while ensuring that the stored data is usable for restoration purposes.

While the example persistent storage (250) has been illustrated as storing only a limited number of data structures associated with a single virtual machine, a persistent storage in accordance with embodiments of the invention may store any number of data structures associated with any number of virtual machines without departing from the invention.

Additionally, the persistent storage may store additional data, less data, and/or different data from that illustrated in FIG. 2B.

Figure 2C:
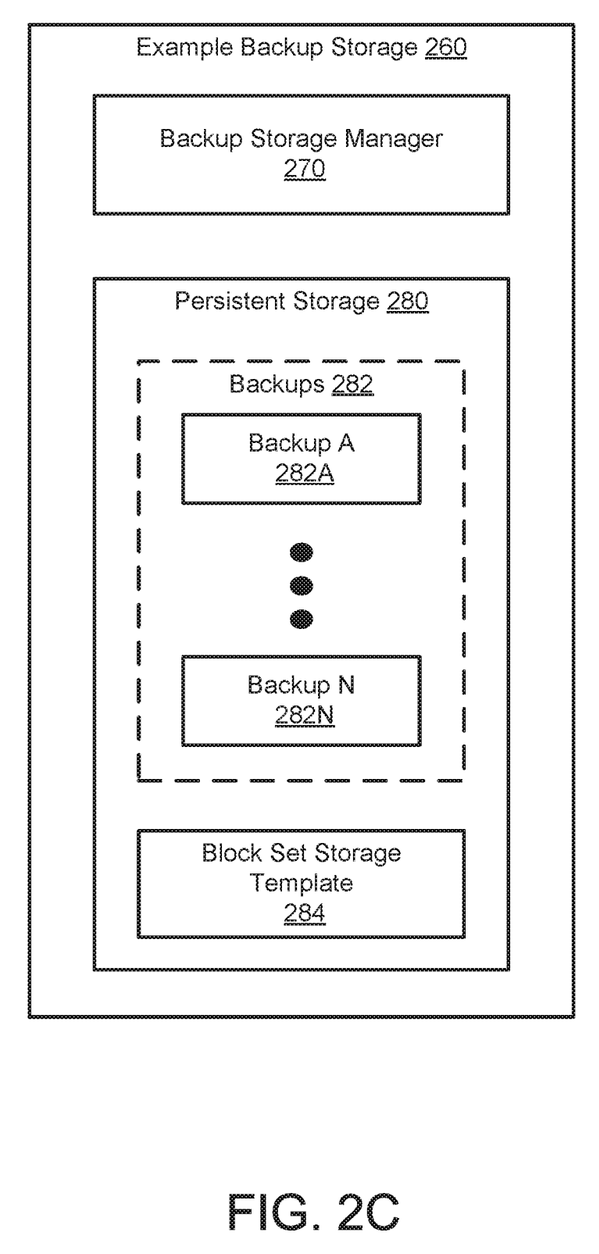
FIG. 2C shows a diagram of an example backup storage in accordance with one or more embodiments of the invention.

As discussed above, data may be stored in a backup storage to provide backup services to production hosts. FIG. 2C shows a diagram of an example backup storage (260) in accordance with one or more embodiments of the invention. The example backup storage (260) may be similar to the backup storages (120, FIG. 1) discussed above. As discussed above, the example backup storage (260) may provide data storage services.

To provide the aforementioned functionality, the example backup storage (260) may include a backup storage manager (270) and a persistent storage (280). Each of the aforementioned components of the example backup storage (260) is discussed below.

In one or more embodiments of the invention, the backup storage manager (270) manages the data stored in the example backup storage (260). The backup storage manager (270) may manage the data by obtaining the data from another entity (e.g., a production host) and allocating a portion of the persistent storage (280) to storing the data. The data may be backups (282) of virtual machines.

In one or more embodiments of the invention, the backup storage manager (270) is a physical device. The physical device may include circuitry. The physical device may be, for example, a field programmable gate array, application specific integrated circuit, programmable processor, microcontroller, digital signal processor, or other hardware processor. The physical device may be adapted to provide the functionality of the backup storage manager (270) described throughout this application and/or all, or a portion, of the method illustrated in FIG. 4.

In one or more embodiments of the invention, the backup storage manager (270) is implemented as computer instructions, e.g., computer code, stored on a persistent storage that when executed by a processor of the example backup storage (260) cause the example backup storage (260) to provide the functionality of the backup storage manager (270) described throughout the application and/or all, or a portion, of the method illustrated in FIG. 4.

In one or more embodiments of the invention, the persistent storage stores data structures used by the backup storage manager (270). The data structures may include backups (282) and a block set storage template (284). The persistent storage may include additional, fewer, and/or different data structures without departing from the invention. Each of the aforementioned data structures is discussed below.

In one or more embodiments of the invention, the backups (282) are copies of backups of portions of production hosts. In other words, the backups may be backups of virtual machines hosted by the production hosts.

In one or more embodiments of the invention, the block set storage template (284) is a data structure that specifies a data layout of the backups. The block set storage template (284) may be stored along with the backups (282) during a backup generation process. In other words, the block set storage template (284) may be the same as the parent block set storage template (256).

Figure 3A:
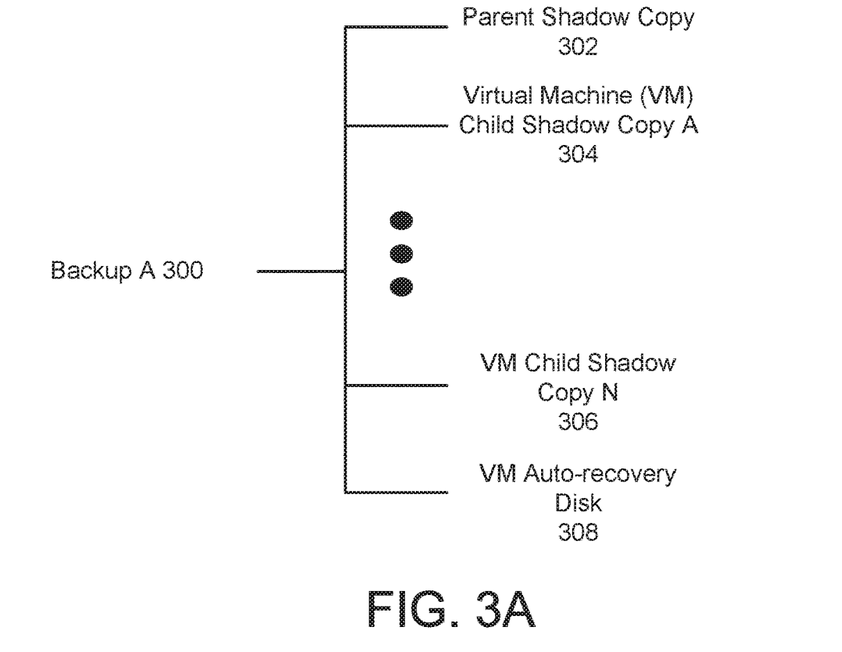
FIG. 3A shows a diagram of a relationship in accordance with one or more embodiments of the invention.
Figure 3B:
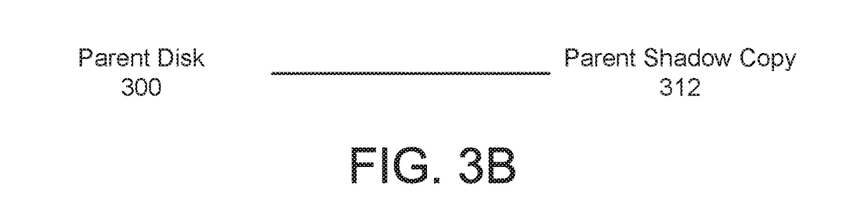
FIG. 3B shows a diagram of a relationship in accordance with one or more embodiments of the invention.
Figure 3C:
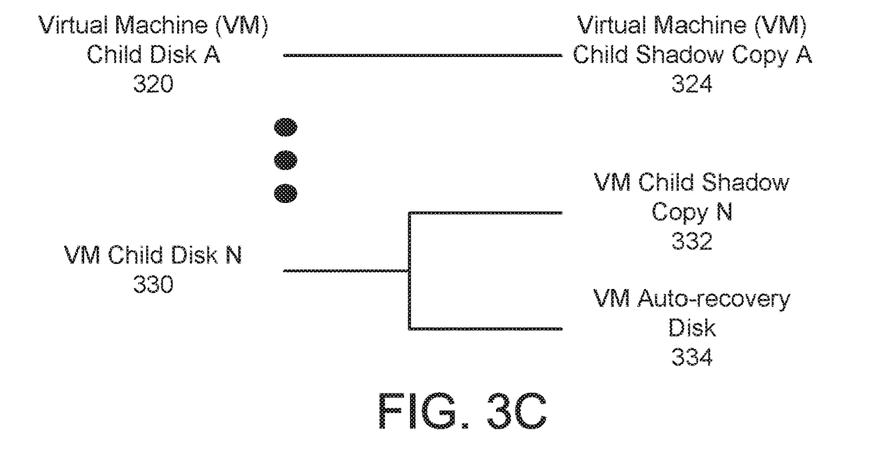
FIG. 3C shows a diagram of a relationship in accordance with one or more embodiments of the invention.

To further clarify embodiments of the invention, FIGS. 3A-3C show relationship diagrams in accordance with embodiments of the invention. Each of these relationships may be present in the system illustrated in FIG. 1.

FIG. 3A shows a diagram of a relationship between a backup and the components of a virtual machine shadow copy in accordance with one or more embodiments of the invention. As seen from FIG. 3A, for a given backup (300) there is a single parent shadow copy (302), one or more virtual machine child shadow copies (e.g., 304, 306), and a virtual machine auto-recovery disk (308). Thus, there may be a one-to-one relationship between a backup and a parent shadow copy as well as a one-to-one relationship between a backup in a virtual machine auto-recovery disk. In contrast, there may be a one-to-many relationship between a backup and virtual machine child shadow copies associated with the backup.

FIG. 3B shows a diagram of a relationship between a parent disk in a parent shadow copy in accordance with one or more embodiments of the invention. As seen from FIG. 3B, there may be a one-to-one relationship between parent disks and parent shadow copies.

FIG. 3C shows a diagram of relationships between child disks and child shadow copies in accordance with one or more embodiments of the invention. As seen from FIG. 3C, there is a one-to-one relationship between virtual machine child disks (e.g., 320) and virtual machine child shadow copies (e.g., 324). However, there is an additional relationship between the most recently generated virtual machine child disk (e.g., 330) and the most recently generated virtual machine shadow copy (e.g., 332). That is, the virtual machine child disk (330) is also associated with a virtual machine auto-recovery disk (334). In other words, the virtual machine child disk (330) includes all of the data of both the virtual machine child shadow copy (332) and the virtual machine auto-recovery disk (334).

As discussed above, backups of production hosts may be stored in backup storage so that restoration services may be provided in the future.

While the various steps in the following flowchart are presented and described sequentially, one of ordinary skill in the relevant art will appreciate that some or all of the steps may be executed in different orders, may be combined or omitted, and some or all steps may be executed in parallel.

FIG. 4 shows a flowchart of a method in accordance with one or more embodiments of the invention. The method depicted in FIG. 4 may be used to provide backup services in accordance with one or more embodiments of the invention. The method shown in FIG. 4 may be performed by, for example, production hosts (130, FIG. 1). Other components of the system illustrated in FIG. 1 may perform the method of FIG. 4 without departing from the invention.

In Step 400, a backup generation request for a virtual machine is obtained.

In one or more embodiments of the invention, the backup generation request is obtained from a remote agent. For example, the remote agent may initiate backup generation for the virtual machine based on a schedule of backups or for other reasons. The backup generation request may be obtained from other entities without departing from the invention.

In Step 402, a virtual machine shadow copy for the virtual machine is generated.

In one or more embodiments of the invention, the virtual machine is quiesced before the virtual machine shadow copy is generated. To quiesce the virtual machine, buffers associated with the virtual machine may be flushed and/or execution of the virtual machine may be suspended. In one or more embodiments of the invention, after and during quiescence of the virtual machine, input to the virtual machine is diverted to one or more temporary buffers. The temporary buffers may be in memory or persistent storage.

One or more embodiments of the invention, a copy of each disk of the virtual machine is generated while the virtual machine is quiesced. Generating the copy includes, at least, generating a copy of a parent disk and generating a copy of at least one child disk. During this copy generation process, input to the virtual machine is continuously diverted to the temporary buffers. After generation of the copies of the virtual machine, a virtual machine auto-recovery disk may be generated. The virtual machine auto-recovery disk may include a copy of the content of the temporary buffers. In other words, copies of the changes to the virtual machine during the copy generation process may be stored in the virtual machine auto-recovery disk. The changes to the virtual machine during the copy generation process may also be applied to a child disk of the virtual machine. By doing so, the child disk may be updated to reflect all of the input to the virtual machine. Similarly, inclusion of the auto-recovery disk in the virtual machine shadow copy ensures that all changes to the virtual machine through the end of the copy generation process are also present in the virtual machine shadow copy.

In one or more embodiments of the invention, the virtual machine auto-recovery disk may be empty if no changes to the virtual machine are made during the copy generation process.

In Step 404, it is determined if there is an auto-recovery disk in the virtual machine shadow copy. In other words, a determination is made about whether any changes to the virtual machine were made during the process of generating virtual machine shadow copy. Those skilled in the art will appreciate that in various embodiments of the invention, an empty auto-discovery disk may be present in the event that there were no changes to the virtual machine during the time period when the virtual machine shadow copy was generated. In such embodiments, the determination is step 404 is whether there is any data in the auto-recovery disk corresponding to changes made to the virtual machine during the time period when the virtual machine shadow copy was generated. Continuing with the discussion of FIG. 4, if there is an auto-recovery disk (or an auto-recovery disk with data for virtual machine during the time period when the virtual machine shadow copy was generated), the method may proceed to Step 408. If there is not an auto-recovery disk in the virtual machine shadow copy (or if there is an auto-recovery disk with no data for virtual machine during the time period when the virtual machine shadow copy was generated), the method may proceed to Step 406.

In Step 406, the virtual machine shadow copy is merged using a local block set storage template to obtain a backup of the virtual machine.

In one or more embodiments of the invention, the virtual machine shadow copy is merged by applying the changes specified by each child disk to the parent disk in the shadow copy. To apply the changes, offsets specified by the local block set storage template are used to apply the changes to the parent disk. By doing so, a backup of the virtual machine is generated that includes a data layout that is identical to the data layout of other backups of the virtual machine stored in backup storage.

For example, each child disk may specify changes to virtual machine data that occurred over a predetermined period of time. Each of the specified changes may be associated with different portions of the virtual machine data. The local block set storage template may specify the locations within the parent disk associated with each of the portions. Thus, using the aforementioned mappings, the changes specified by the child disk may be applied to the corresponding portions of the parent disk. Doing so may generate a data structure reflecting a backup of the virtual machine by repeating this process for each child disk of the shadow copy.

The method may proceed to step 410 following step 406.

Returning to Step 406, the method may proceed to step 408 when there is an auto-recovery disk in the virtual machine shadow copy. In Step 408, the virtual machine shadow copy is merged using a parent block set storage template to obtain a backup of the virtual machine.

In one or more embodiments of the invention, the virtual machine shadow copy is merged by applying the changes specified by each child disk to the parent disk in the shadow copy and the changes specified by the virtual machine auto-recovery disk to the parent disk in the shadow copy. To apply the changes, offsets specified by the parent block set storage template are used to apply the changes to the parent disk. By doing so, a backup of the virtual machine is generated that includes a data layout that is identical to the data layout of other backups of the virtual machine stored in backup storage.

If, in contrast, the local block set storage template was used to apply the changes, the data layout of the resulting backup of the virtual machine may have a different layout from other backups stored in backup storage. Doing so may make the backups unusable for restoration services because of the different locations of portions of the virtual machine data in the backup.

Like generating a backup in Step 406, each child disk may specify changes to virtual machine data that occurred over a predetermined period of time. However, auto-recovery disk may specify changes to the virtual machine while the child disks were being generated. Thus, all of the child disks of the shadow copy and the auto-recovery disk are required to represent data included in the child disks, i.e., the live disks, of the virtual machine. Each of the specified changes specified by the child disks of the shadow copy and the auto-recovery disk may be associated with different portions of the virtual machine data. The parent block set storage template may specify the locations within the parent disk associated with each of the portions. Thus, using the aforementioned mappings, the changes specified by the child disk and auto-recovery disk may be applied to the corresponding portions of the parent disk. Doing so may generate a data structure reflecting a backup of the virtual machine by repeating this process for each child disk of the shadow copy and the auto-recovery disk of the shadow copy.

In step 410, the backup is stored in backup storage.

In one or more embodiments of the invention, the backup is stored in backup storage by sending a copy of the backup and the block set storage template used to generate the backup. Both may be stored in the backup storage to provide restoration services in the future.

In one or more embodiments of the invention, storing the backup in backup storage includes storing a copy of the block set storage template used to generate the backup as a parent block set storage template and persistent storage. By doing so, a block set storage template that reflects backups stored in backup storage may be accessed without accessing the backup storage. By doing so, embodiments of the invention may reduce computing resource consumption for future backup generation. For example, network bandwidth and computing resources of the backup storage may be conserved.

The method may end following Step 410.

Figure 5A:
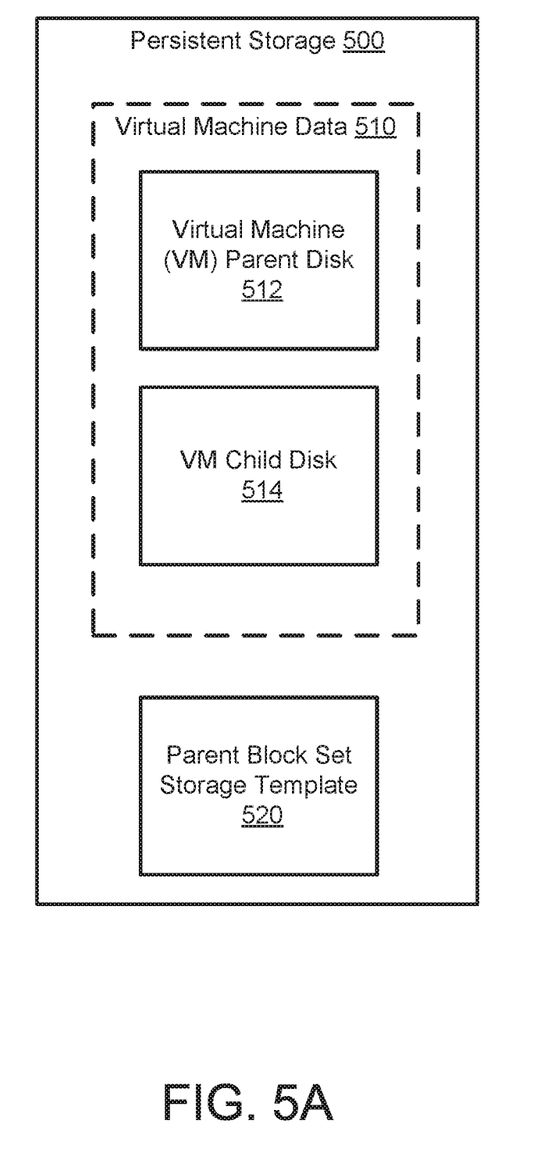
FIG. 5A shows a diagram of an example persistent storage of a production host.
Figure 5B:
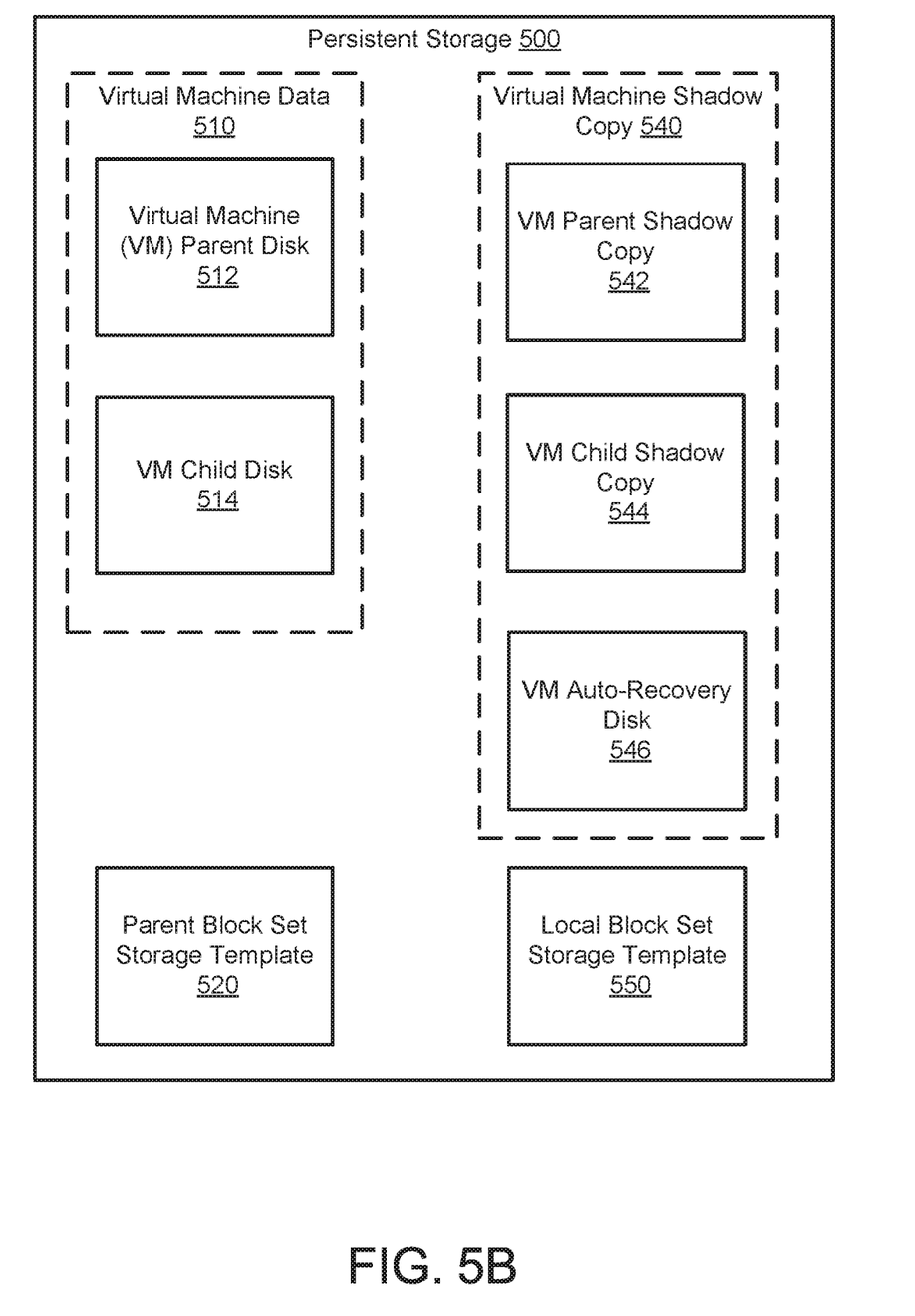
FIG. 5B shows a diagram of an example updated persistent storage of FIG. 5A.

To further clarify aspects of embodiments of the invention, a non-limiting example is illustrated in FIGS. 5A-5C.

Example

Consider a scenario as shown in FIG. 5A where a persistent storage (500) of a production host (not shown) stores virtual machine data (510) associated with a virtual machine hosted by the production host. The virtual machine data (510) includes a virtual machine parent disk (512) and a virtual machine child disk (514). Additionally, the persistent storage (500) hosts a parent block set storage template (520) that was used to generate a previous backup that is now stored in backup storage (not shown).

At a first point in time, the production host receives a backup generation request for the virtual machine. In response to the backup generation request, the production host initiates a backup generation for the virtual machine. To do so, a virtual machine shadow copy (540) is generated as seen in FIG. 5B. The virtual machine shadow copy (540) includes a virtual machine parent shadow copy (542), a virtual machine child shadow copy (544), and a virtual machine auto-recovery disk (546). Additionally, a local block set storage template (550) was generated as part of the virtual machine shadow copy (540) generation process.

To generate a backup for storage in backup storage, the production host checks to determine whether the virtual machine auto-recovery disk (546) includes data. In other words, the production host checks to determine whether data was written to the virtual machine while the virtual machine parent shadow copy and the virtual machine child shadow copy were generated. In this case, virtual machine auto-recovery disk (546) includes data and, therefore, indicates that data was written to the virtual machine during the copy generation process.

In response to determining that the virtual machine auto-recovery disk (546) includes data, the virtual machine auto-recovery disk (546) and the virtual machine child shadow copy (544) are merged with the virtual machine parent shadow copy (542) using the parent block set storage template (520). Doing so generates a backup of the virtual machine data (510). The production host sends the generated backup to a backup storage for storage.

End of Example

Figure 6:
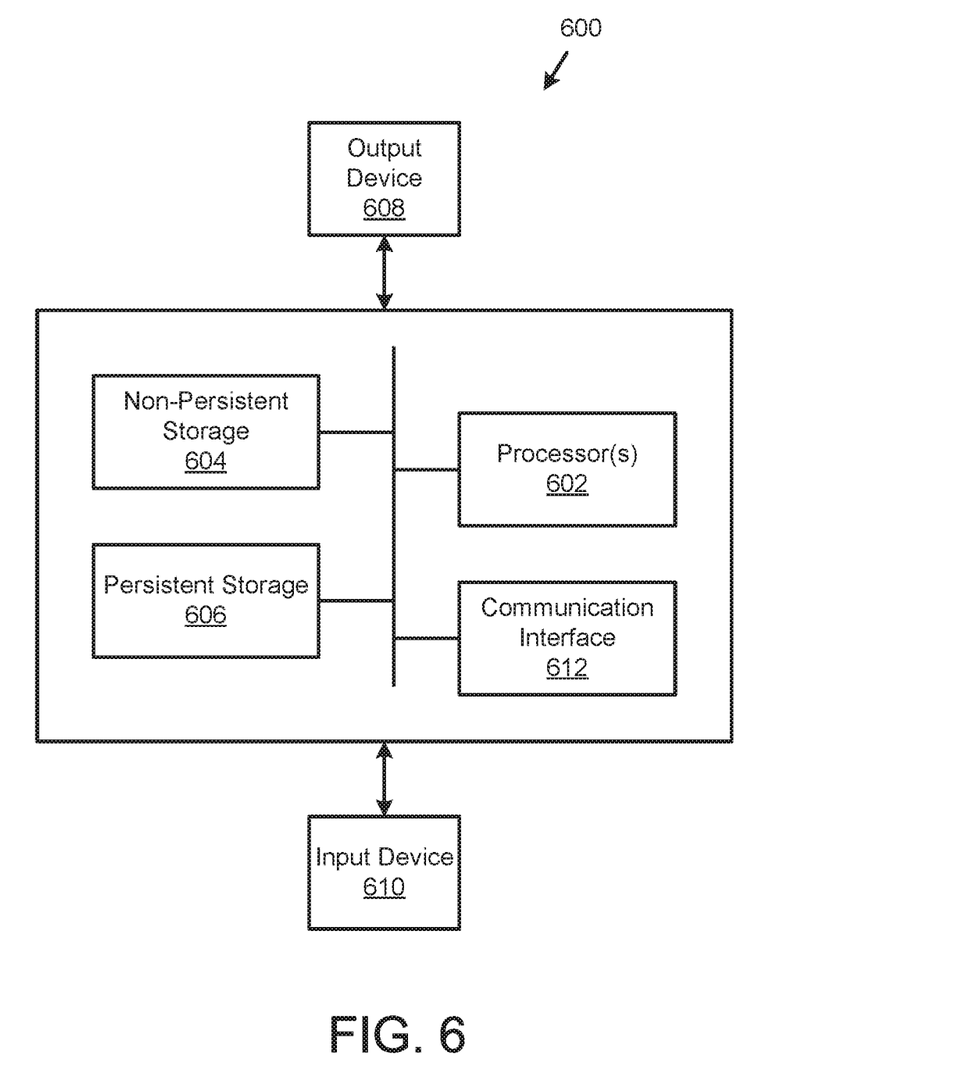
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

Embodiments of the invention may improve backup technology. Specifically, embodiments of the invention may improve backup generation technology by decreasing the computing resources used for backup generation in a distributed environment. For example, embodiments of the invention may provide a method for generation of consistent backups and storage of consistent backups in backup storage without relying on communication with the backup storage for data layout information. Thus, embodiments of the invention may provide a method for generation storage and backups that consumes fewer computing resources than contemporary methods.

Thus, embodiments of the invention may address the problem of computing resource limitations in distributed environments. This problem arises due to the technological nature of the environment in which backups are generated. In other words, a distributed system environment that partitions computing resources in separate locations interconnected via relatively low bandwidth network connections.

The problems discussed above should be understood as being examples of problems solved by embodiments of the invention disclosed herein and the invention should not be limited to solving the same/similar problems. The disclosed invention is broadly applicable to address a range of problems beyond those discussed herein.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A production host for hosting virtual machines, comprising:
a persistent storage for storing:
virtual machine data associated with a virtual machine of the virtual machines, and
a virtual machine shadow copy associated with the virtual machine data; and
a production agent programmed to:
obtain a backup generation request for the virtual machine; and
in response to the backup generation request:
generate the virtual machine shadow copy;
make a determination that the virtual machine shadow copy comprises an auto-recovery disk that comprises some data;
in response to the determination:
merge the virtual machine shadow copy using a parent block set storage template to obtain a backup of the virtual machine, wherein the parent block set storage template is not associated with the virtual machine shadow copy; and
store the backup in backup storage.

2. The production host of claim 1, wherein the production agent is further programmed to:
obtain a second backup generation request for a second virtual machine; and
in response to the second backup generation request:
generate a second virtual machine shadow copy;
make a second determination that the second virtual machine shadow copy comprises second auto-recovery disk that does not comprises any data;
in response to the second determination:
merge the second virtual machine shadow copy using a local block set storage template to obtain a second backup of the second virtual machine, wherein the local block set storage template is associated with a second virtual machine shadow copy associated with the second virtual machine; and
store the second backup in the backup storage.

3. The production host of claim 1, wherein the virtual machine data comprises:
a virtual machine parent disk; and
a virtual machine child disk,
wherein the backup is based on both of the virtual machine parent disk and the virtual machine child disk.

4. The production host of claim 3, wherein the virtual machine shadow copy comprises:
a virtual machine parent shadow copy;
a virtual machine child shadow copy; and
a virtual machine auto-recovery disk,
wherein the virtual machine parent shadow copy is a copy of the virtual machine parent disk,
wherein the virtual machine child shadow copy is a partial copy of the virtual machine child disk.

5. The production host of claim 4, wherein the virtual machine auto-recovery disk comprises:
a second partial copy of the virtual machine child disk,
wherein the second partial copy comprises a first portion of the virtual machine child disk, the partial copy comprises a second portion of the virtual machine child disk, and the first portion is different from the second portion.

6. The production host of claim 4, wherein the virtual machine child disk consists of the virtual machine child shadow copy and the virtual machine auto-recovery disk.

7. The production host of claim 1, wherein generating the virtual machine shadow copy comprises:
while the virtual machine is quiesced:
generating a copy of the virtual machine data; and
modifying the copy to include additional data written to the virtual machine while the virtual machine was quiesced.

8. A method for hosting virtual machines, comprising:
obtaining a backup generation request for a virtual machine of the virtual machines; and
in response to the backup generation request:
generating a virtual machine shadow copy using virtual machine data associated with a virtual machine of the virtual machines;
making a determination that the virtual machine shadow copy comprises an auto-recovery disk that comprises some data;
in response to the determination:
merging the virtual machine shadow copy using a local block set storage template to obtain a backup of the virtual machine, wherein the local block set storage template is associated with the virtual machine shadow copy; and
storing the backup in backup storage,
wherein the local block set storage template is disassociated from the virtual machine data.

9. The method of claim 8, the method further comprising:
obtaining a second backup generation request for a second virtual machine; and
in response to the second backup generation request:
generating a second virtual machine shadow copy;
making a second determination that the second virtual machine shadow copy comprises second auto-recovery disk that does not comprises any data;
in response to the second determination:
merging the second virtual machine shadow copy using a parent block set storage template to obtain a second backup of the second virtual machine, wherein the parent block set storage template is associated with virtual machine associated with the second virtual machine; and
storing the second backup in the backup storage.

10. The method of claim 8, wherein the virtual machine data comprises:
a virtual machine parent disk; and
a virtual machine child disk,
wherein the backup is based on both of the virtual machine parent disk and the virtual machine child disk.

11. The method of claim 10, wherein the virtual machine shadow copy comprises:
a virtual machine parent shadow copy;
a virtual machine child shadow copy; and
a virtual machine auto-recovery disk,
wherein the virtual machine parent shadow copy is a copy of the virtual machine parent disk,
wherein the virtual machine child shadow copy is a partial copy of the virtual machine child disk.

12. The method of claim 11, wherein the virtual machine auto-recovery disk comprises:
a second partial copy of the virtual machine child disk,
wherein the second partial copy comprises a first portion of the virtual machine child disk, the partial copy comprises a second portion of the virtual machine child disk, and the first portion is different from the second portion.

13. The method of claim 11, wherein the virtual machine child disk consists of the virtual machine child shadow copy and the virtual machine auto-recovery disk.

14. The method of claim 8, wherein generating the virtual machine shadow copy comprises:
while the virtual machine is quiesced:
generating a copy of the virtual machine data; and
modifying the copy to include additional data written to the virtual machine while the virtual machine was quiesced.

15. A non-transitory computer readable medium comprising computer readable program code, which when executed by a computer processor enables the computer processor to perform a method for hosting virtual machines, the method comprising:
obtaining a backup generation request for a virtual machine of the virtual machines; and
in response to the backup generation request:
generating a virtual machine shadow copy using virtual machine data associated with a virtual machine of the virtual machines;
making a determination that the virtual machine shadow copy comprises an auto-recovery disk that comprises some data;
in response to the determination:
merging the virtual machine shadow copy using a local block set storage template to obtain a backup of the virtual machine, wherein the local block set storage template is associated with the virtual machine shadow copy; and
storing the backup in backup storage,
wherein the local block set storage template is disassociated from the virtual machine data.

16. The non-transitory computer readable medium of claim 15, the method further comprising:
obtaining a second backup generation request for a second virtual machine; and
in response to the second backup generation request:
generating a second virtual machine shadow copy;
making a second determination that the second virtual machine shadow copy comprises second auto-recovery disk that does not comprises any data;
in response to the second determination:
merging the second virtual machine shadow copy using a parent block set storage template to obtain a second backup of the second virtual machine, wherein the parent block set storage template is associated with virtual machine associated with the second virtual machine; and
storing the second backup in the backup storage.

17. The non-transitory computer readable medium of claim 15, wherein the virtual machine data comprises:
a virtual machine parent disk; and
a virtual machine child disk,
wherein the backup is based on both of the virtual machine parent disk and the virtual machine child disk.

18. The non-transitory computer readable medium of claim 17, wherein the virtual machine shadow copy comprises:
a virtual machine parent shadow copy;
a virtual machine child shadow copy; and
a virtual machine auto-recovery disk,
wherein the virtual machine parent shadow copy is a copy of the virtual machine parent disk,
wherein the virtual machine child shadow copy is a partial copy of the virtual machine child disk.

19. The non-transitory computer readable medium of claim 18, wherein the virtual machine auto-recovery disk comprises:
a second partial copy of the virtual machine child disk,
wherein the second partial copy comprises a first portion of the virtual machine child disk, the partial copy comprises a second portion of the virtual machine child disk, and the first portion is different from the second portion.

20. The non-transitory computer readable medium of claim 15, wherein generating the virtual machine shadow copy comprises:
while the virtual machine is quiesced:
generating a copy of the virtual machine data; and
modifying the copy to include additional data written to the virtual machine.

* * * * *